(12) United States Patent
Jung et al.

(10) Patent No.: US 8,275,616 B2
(45) Date of Patent: Sep. 25, 2012

(54) SYSTEM FOR DETECTING SPEECH INTERVAL AND RECOGNIZING CONTINUOUS SPEECH IN A NOISY ENVIRONMENT THROUGH REAL-TIME RECOGNITION OF CALL COMMANDS

(75) Inventors: Heui-Suck Jung, Incheon (KR); Se-Hoon Chin, Seoul (KR); Tae-Young Roh, Bucheon-si (KR)

(73) Assignee: KoreaPowerVoice Co., Ltd. (KR)

( * ) Notice: Subject to any disclaimer, the term of this patent is extended or adjusted under 35 U.S.C. 154(b) by 23 days.

(21) Appl. No.: 12/863,437

(22) PCT Filed: Apr. 22, 2009

(86) PCT No.: PCT/KR2009/002118
§ 371 (c)(1),
(2), (4) Date: Jul. 17, 2010

(87) PCT Pub. No.: WO2009/145508
PCT Pub. Date: Dec. 3, 2009

(65) Prior Publication Data
US 2011/0054892 A1    Mar. 3, 2011

(30) Foreign Application Priority Data

May 28, 2008  (KR) .......................... 10-2008-0049455

(51) Int. Cl.
*G10L 15/00* (2006.01)
(52) U.S. Cl. .......................... 704/240; 704/226; 704/215
(58) Field of Classification Search .................. 704/240, 704/226, 215
See application file for complete search history.

(56) References Cited

U.S. PATENT DOCUMENTS

| | | | | |
|---|---|---|---|---|
| 5,832,430 | A * | 11/1998 | Lleida et al. | 704/256 |
| 6,980,956 | B1 * | 12/2005 | Takagi et al. | 704/275 |
| 7,203,652 | B1 * | 4/2007 | Heck | 704/273 |
| 2001/0056349 | A1 * | 12/2001 | St. John | 704/270 |

(Continued)

FOREIGN PATENT DOCUMENTS

JP    2006-184589 A    7/2006

(Continued)

OTHER PUBLICATIONS

D.B. Paul et al., Speaker stress resistant continuous speech recognition 1988, Proceedings of the Int. Conf. on acoustic speech and signal processing, pp. 283-286.*

(Continued)

*Primary Examiner* — Jakieda Jackson
(74) *Attorney, Agent, or Firm* — Cantor Colburn LLP

(57) ABSTRACT

The present invention relates to a continuous speech recognition system that is very robust in a noisy environment. In order to recognize continuous speech smoothly in a noisy environment, the system selects call commands, configures a minimum recognition network in token, which consists of the call commands and mute intervals including noises, recognizes the inputted speech continuously in real time, analyzes the reliability of speech recognition continuously and recognizes the continuous speech from a speaker. When a speaker delivers a call command, the system for detecting the speech interval and recognizing continuous speech in a noisy environment through the real-time recognition of call commands measures the reliability of the speech after recognizing the call command, and recognizes the speech from the speaker by transferring the speech interval following the call command to a continuous speech-recognition engine at the moment when the system recognizes the call command.

1 Claim, 7 Drawing Sheets

U.S. PATENT DOCUMENTS

| | | | |
|---|---|---|---|
| 2002/0161581 A1 | 10/2002 | Morin | |
| 2003/0023437 A1* | 1/2003 | Fung | 704/236 |
| 2005/0149326 A1* | 7/2005 | Hogengout et al. | 704/242 |
| 2006/0074651 A1 | 4/2006 | Arun | |
| 2007/0179784 A1* | 8/2007 | Thambiratnam et al. | 704/255 |
| 2009/0055185 A1* | 2/2009 | Nakade et al. | 704/257 |
| 2011/0224987 A1* | 9/2011 | Gierach | 704/248 |

FOREIGN PATENT DOCUMENTS

| | | |
|---|---|---|
| KR | 10-2006-0097895 A | 9/2006 |
| KR | 0679044 B1 | 2/2007 |
| KR | 10-2008-0013541 A | 2/2008 |
| WO | 2007-045723 A1 | 4/2007 |

OTHER PUBLICATIONS

Hofstetter et al., Techniques for task independent word spotting in continuous speech messages 1992, Lincoln Laboratory MIT, pp. II-101-II-104.*

Lee et al., Automatic speech and speaker recognition 1996, Kluwer Academic Publishers, chapter 13 pp. 303-329.*

International Search Report for PCT/KR2009/002118.

KIPO Office Action for Korean Patent Application No. 10-2008-0049455 corresponding to U.S. Appl. No. 12/863,437.

* cited by examiner

SYSTEM FOR DETECTING SPEECH INTERVAL AND RECOGNIZING CONTINUOUS SPEECH IN A NOISY ENVIRONMENT THROUGH REAL-TIME RECOGNITION OF CALL COMMANDS

TECHNICAL FIELD

The present invention relates, in general, to a continuous speech recognition system, and, more particularly, to a continuous speech recognition system, which, in order to smoothly perform continuous speech recognition in noisy environments, selects call commands and configures a minimum recognition network composed of a silence interval accompanied by noise and the call commands in the form of tokens, so that real-time speech recognition is continuously performed on input speech, the confidence of the input speech is continuously analyzed, and speech subsequently input by a speaker is recognized, thus being robust in noisy environments.

BACKGROUND ART

The means by which a human being expresses his or her thoughts to another party can be configured in various forms, but speech is the most basic communication of these means used by human beings.

Speech processing by human beings can be divided into the two aspects of speech production and speech perception. Speech production refers to a series of procedures allowing a speaker to communicate his or her intention, and speech perception refers to a series of procedures enabling spoken contents to be perceived from the speech spoken by another party. Research into these two types of speech aspects has been individually conducted, and has been followed by various academic environments such as linguistics, phonetics, phonology, physiology, and anatomy.

Access methods of performing speech recognition from the standpoint of speech perception of speech processing can be classified into four types of methods, that is, an acoustic-phonetic method, a statistical pattern recognition method, an artificial intelligence method, and a neural network method. Speech recognition systems using the above-described various access methods can be classified into isolated word speech recognition systems that recognize isolated words according to the type of vocalization, and continuous speech recognition systems that recognize speech made by continuously speaking words.

Of these speech recognition systems, an isolated word speech recognition system is a scheme for performing recognition in the sequence of Voice Activity Detection (VAD) →feature extraction→pattern comparison→recognition, and is a technology which is suitable for small computational loads or small-scale speech recognition, but is unsuitable for commercialization because unregistered words are rejected only by confidence detection with the result that errors frequently occur in confidence detection depending on noisy environments, and because a special event such as a recording button for speech recognition is required.

FIG. 1 is a diagram briefly showing the construction of a conventional continuous speech recognition network. The continuous speech recognition network employs a scheme that performs recognition by performing post-processing on a recognized word sequence using a language model. This scheme is mainly used in large-capacity speech recognition systems of ten thousand or more words.

A continuous speech recognition system is a scheme for performing recognition in the sequence of feature extraction→pattern comparison (acoustic model comparison)→language model comparison→post-processing→recognition, is suitable for large-scale speech recognition systems in high-specification server level Personal Computers (PCs), and also enables a real-time large-scale speech recognition system to be implemented with the development of storage media and computational processing abilities. However, there are disadvantages because, in order to install such a continuous speech recognition system in terminals which have gradually become lightweight, still as of yet insufficient storage capacity and complicated floating computation cause problems, and a large computational load and storage capacity for a large amount of data are required.

FIG. 2 is a diagram showing a speech waveform produced by speaking the same command in a vehicle which has not been started, and FIG. 3 is a diagram showing a speech waveform produced by speaking the same command in a vehicle which is traveling with the window open. With regard to the comparison between FIGS. 2 and 3, the performance of Voice Activity Detection (VAD) using existing energy or Zero Crossing Rate (ZCR) remarkably decreases due to the influence of the vibrating sound of a vehicle engine, the output sound of multimedia devices, and the wind which is there when the window of the vehicle is open, in an actual vehicle environment. Therefore, in a conventional speech recognition apparatus in a vehicle, a vehicle driver presses a hot-key to generate a speech recognition event, and then speech recognition is conducted. Such a function causes a user to feel inconvenience even if the conventional speech recognition apparatus is a small-scale speech recognition system having relatively excellent performance such as the electronic control of the vehicle or the menu control of a navigation terminal basically mounted in the vehicle, thus becoming a large obstacle to commercialization.

DISCLOSURE

Technical Problem

The present invention has been made keeping in mind the above problems occurring in the prior art, and an object of the present invention is to provide a system for detecting a speech interval in noisy environments using speech call commands, which is based on the changes of a speech recognition network and the detection of confidence rate.

Another object of the present invention is to provide a system for detecting a speech interval in noisy environments using call commands, which can solve the disadvantage of a conventional keyword detection-based continuous speech recognition technique which cannot perform real-time processing due to the large computational load, a language model which must be changed according to the field of application, and the use of post-processing, and can solve the disadvantage of a conventional isolated word recognition system which requires a special event, thus enabling the system to always wait for speech recognition to occur.

A further object of the present invention is to provide a system for detecting a speech interval in noisy environments using call commands, which can solve the disadvantage of an isolated word recognition system which requires a special event for speech recognition while solving the disadvantage of a conventional keyword detection-based continuous speech recognition technique which requires not only a large computational load but also the change of a language model or post-processing, thus enabling the system to always wait for speech recognition to occur.

Advantageous Effects

According to the construction of the present invention, in order to smoothly perform continuous speech recognition in noisy environments, a call command such as 'Naraeya' or 'Nepiya' is selected, and a minimum recognition network composed of silence interval accompanied by noise and the call command is configured in the form of tokens, so that real-time speech recognition is continuously performed on input speech, the confidence of the input speech is continuously analyzed, and the subsequently input speech intervals of a speaker, as well as buffered speech intervals, are applied to a continuous speech recognition engine at the moment at which the call command from the speaker is recognized, thus enabling continuous speech recognition which is very robust in noisy environments.

BEST MODE

Figure 1:
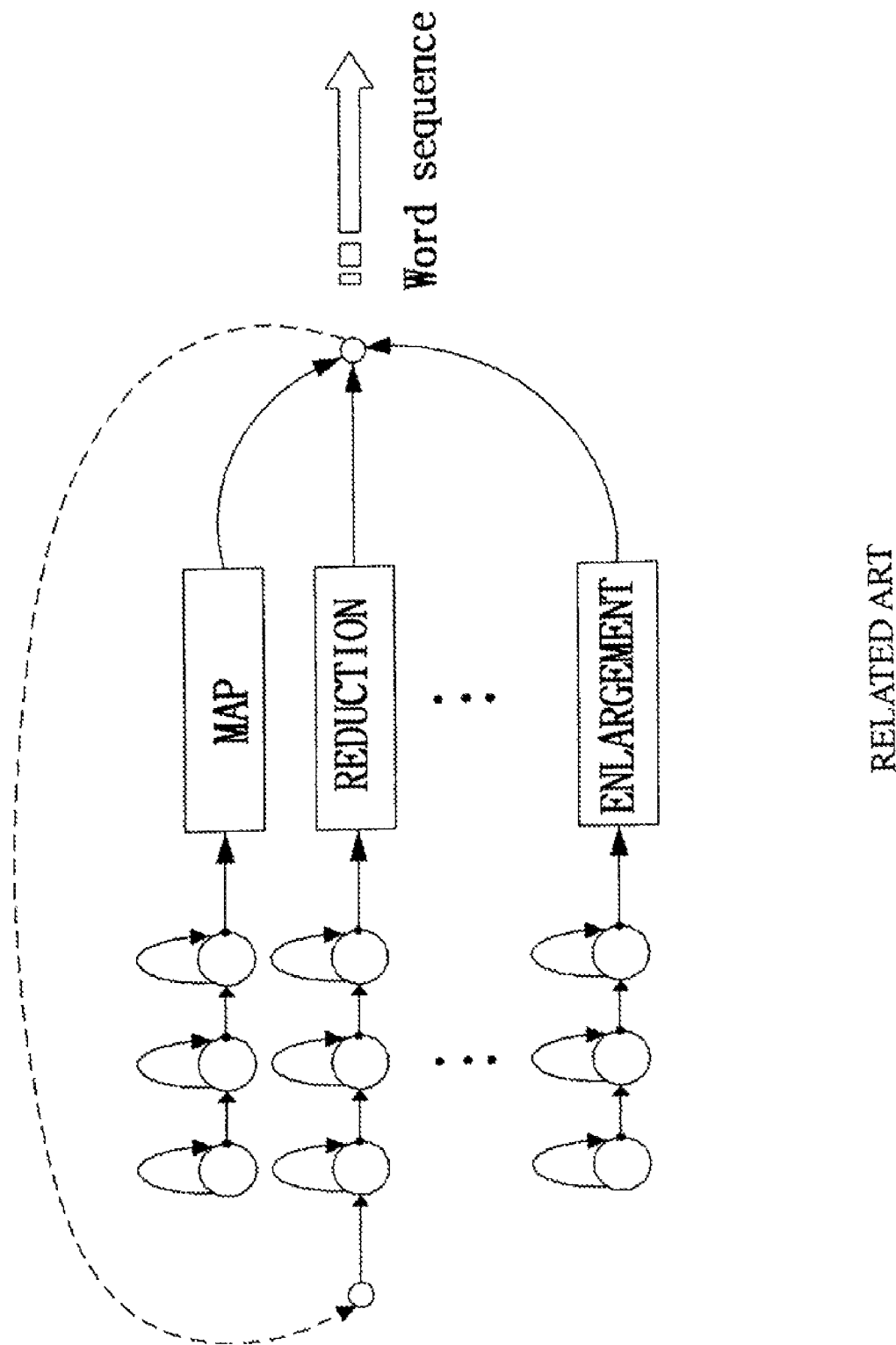
FIG. 1 is a diagram briefly showing the construction of a conventional continuous speech recognition network.
Figure 2:
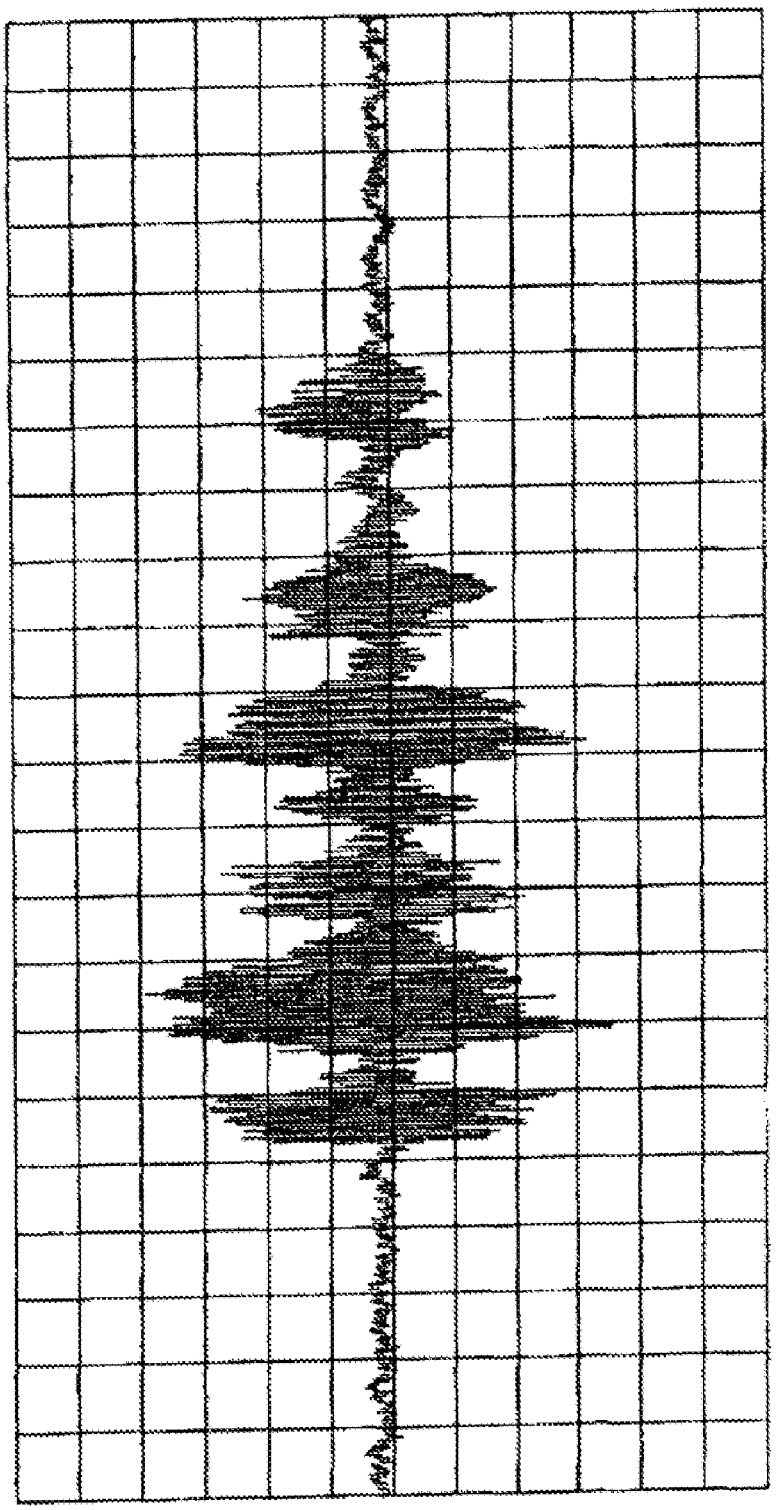
FIG. 2 is a diagram showing a speech waveform produced by speaking the same command in a vehicle which has not been started.
Figure 3:
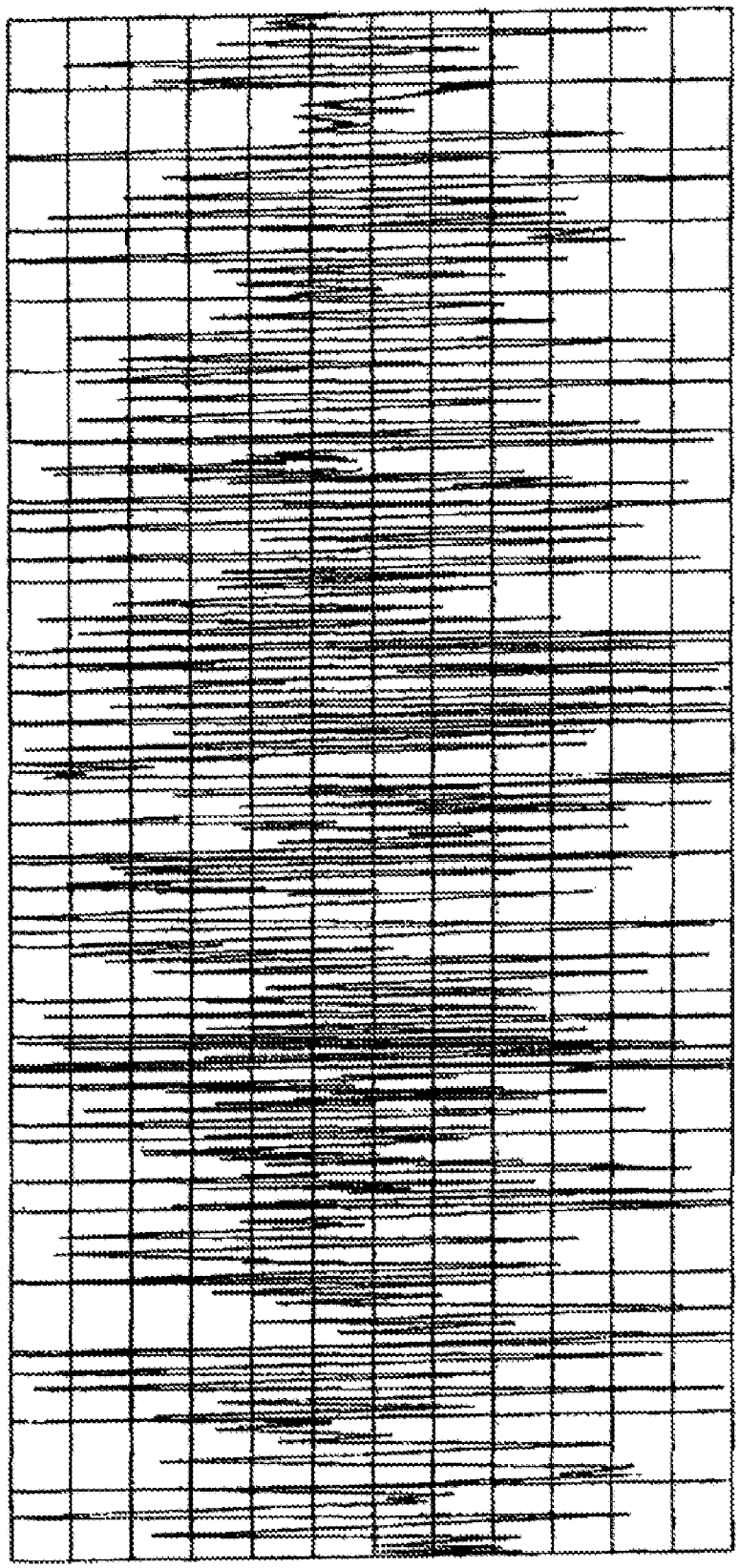
FIG. 3 is a diagram showing a speech waveform produced by speaking the same command while a vehicle is traveling with the window open.

In order to accomplish the above objects, the present invention provides a system for detecting a speech interval and recognizing continuous speech using real-time recognition of call commands, wherein when a speaker speaks a call command, the call command is recognized, confidence rate of the call command is measured, and a speech interval spoken subsequent to the call command is applied to a continuous speech recognition engine at a moment at which the call command is recognized, thus recognizing speech of the speaker.

In this case, the recognition of the call command is performed by a call command recognition network which is implemented using a Left-to-Right (LTR) model, and a speech frame input to the recognition network is configured to include predetermined tokens and is compared based on probability with the recognition network in real time.

In this case, each of the predetermined tokens includes the speech frame and a silence interval accompanied by noise.

In this case, the call command recognition network is configured such that, when an accumulated probability of the predetermined token which is computed in real time after passing through the call command recognition network falls within a range of a predetermined upper percentage, the call command is estimated to have been spoken, and the speech frame is transferred to a confidence measurement stage.

In this case, the speech frame is configured such that a beam width thereof is limited to 20 or 30 tokens.

In this case, the predetermined upper percentage is 10%.

In this case, the confidence rate is determined by the following equation:

$$LLR_k(0,\lambda_k) = \log p(0|\lambda_k) - \log p(0|\lambda_{\bar{k}})$$

where LLR is log likelihood ratio, $\lambda_k$ is a phoneme model, and $\lambda_{\bar{k}}$ is an anti-phoneme model.

Further, the present invention provides a system for detecting a speech interval and recognizing continuous speech using real-time recognition of call commands, comprising a call command recognition network including a call command search routine of searching for a call command in real time, and a confidence detection routine of detecting confidence rate of the call command found by the call command search routine; and a continuous speech recognition network for recognizing speech input from a speaker subsequent to the call command at a moment at which the call command is recognized by the call command recognition network.

In this case, the call command recognition network comprises an adaptive filter, a feature extraction unit and a keyword searching unit.

In this case, the continuous speech recognition network comprises a token passing unit, a keyword spotting unit, a confidence detection unit and a rule check unit.

MODE FOR INVENTION

Hereinafter, techniques, structures and operating characteristics of a system for detecting a speech interval and recognizing continuous speech in noisy environments using the real-time recognition of call commands (hereinafter referred to as a 'call command/continuous speech recognition system') according to the present invention will be described in detail with reference to the attached drawings.

The call command/continuous speech recognition system according to the present invention selects a call command such as 'Naraeya' or 'Nepiya' and configures a minimum recognition network composed of a silence interval accompanied by noise and the call command in the form of tokens in order to smoothly perform continuous speech recognition in noisy environments, so that real-time speech recognition is continuously performed on input speech, the confidence of the input speech is continuously analyzed, and the subsequently input speech intervals of a speaker, as well as buffered speech intervals, are applied to a continuous speech recognition engine at the moment at which the call command from the speaker is recognized, thus performing continuous speech recognition which is very robust in noisy environments.

Figure 4:
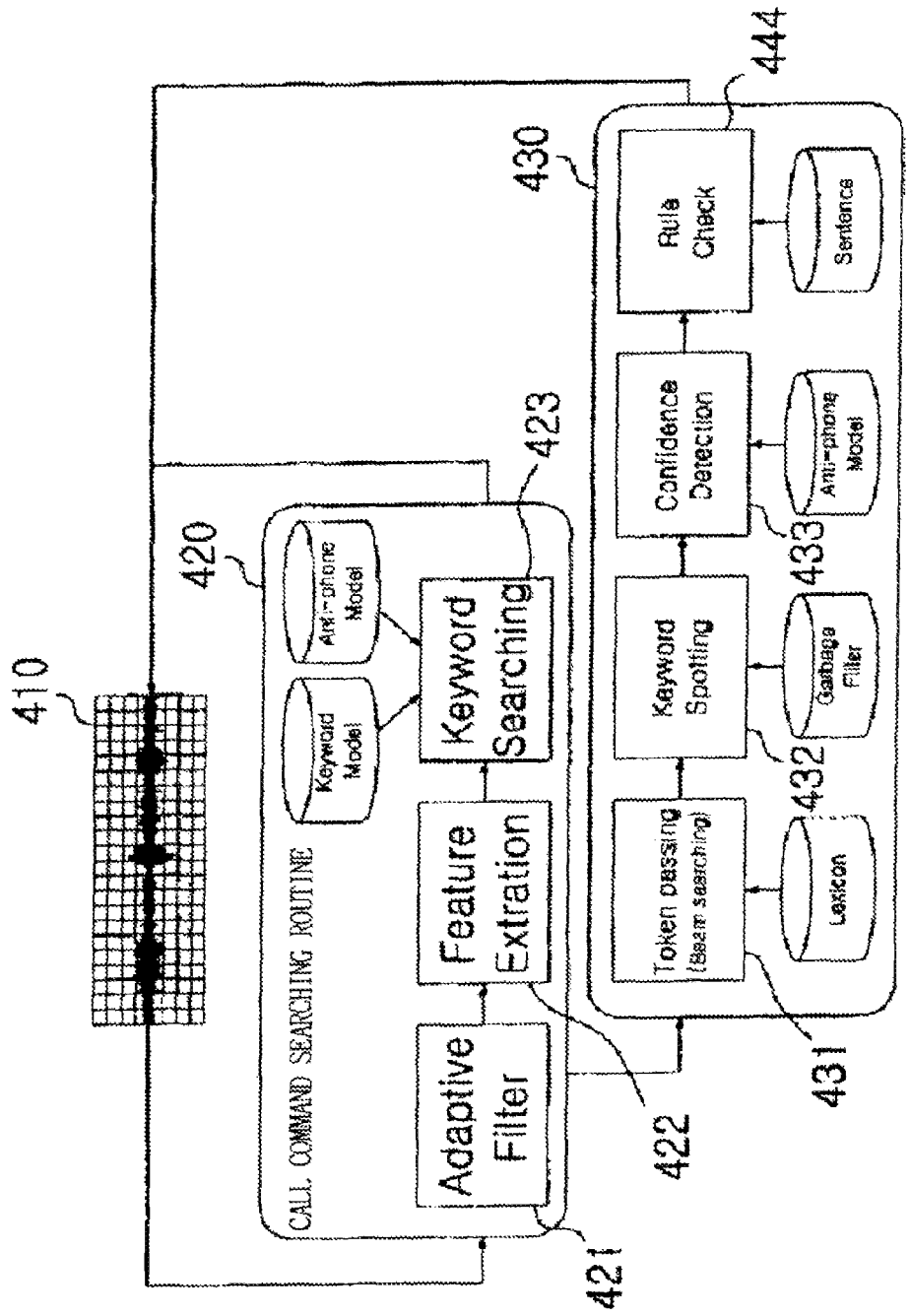
FIG. 4 is a block diagram showing a continuous speech recognition system including a call command search routine in noisy environments according to the present invention.

FIG. 4 is a block diagram showing a continuous speech recognition system including a call command search routine in noisy environments according to the present invention.

As shown in FIG. 4, the system for detecting a speech interval and recognizing continuous speech in noisy environments using the real-time recognition of call commands according to the present invention executes a call command recognition network, which mainly includes a call command search routine for searching for call commands and a confidence detection routine 421, 422 and 423 for detecting the confidence of the found call commands, before executing a continuous speech recognition network 430.

The call command recognition network 420 includes an adaptive filter 421, a feature extraction unit 422, and a keyword searching unit 423, and the continuous speech recognition network 430 includes a token passing unit 431, a keyword spotting unit 432, a confidence detection unit 433, and a rule check unit 444.

In the call command recognition network 420, a minimum recognition network composed of a silence, interval accompanied by noise and a call command from the speaker is configured in the form of tokens, thus enabling real-time speech recognition to be continuously performed on input speech. When the call command is recognized as the call command from the speaker through the call command search routine, the confidence of the call command is detected in the confidence detection routine which is a subsequent stage. Accordingly, whether the found call command is an authentic call command intended by the speaker or a false call command is determined, thus enabling the recognition of continuous speech to be performed on commands spoken subsequent to the call command.

The construction and function of the call command recognition network 420 will be described below.

The adaptive filter 421 is a Finite Impulse Response (FIR) filter for automatically tracking the spectrum characteristics of surrounding noise from noise-containing input speech (all spoken voices including call commands) and eliminating the surrounding noise.

The feature extraction unit 422 is a component for audibly modeling the spectrum characteristics of the input speech, having passed through the adaptive filter 421, for each frame, and converting the spectrum characteristics into robust parameters.

The keyword searching unit 423 determines whether relevant speech is a call command using an acoustic model database (DB), a pronunciation dictionary DB and a language model DB, and then determines whether to execute the continuous speech recognition routine. The keyword searching unit 423 includes a token passing unit for configuring a speech frame, which includes a silence interval accompanied by noise and call commands from the speaker, in the form of a minimum number of tokens, and then searching for call commands, and a confidence detection unit for detecting the confidence of each recognized call command in relation to whether the recognized call command is an authentic or false command.

When the speech of the speaker is recognized as the call command by the call command recognition network 420, the process proceeds to the subsequent stage, that is, the continuous speech recognition network 430. The construction and function of the continuous speech recognition network 430 will be described below.

First, the token passing unit 431 is a component for searching for input speech in the configured continuous speech recognition network.

The keyword spotting unit 432 is a component for spotting a keyword from a token for which beam search is conducted using keywords and filler models.

The confidence detection unit 433 is a component for determining whether a recognized keyword is authentic or false by detecting the confidence of the keyword.

The rule check unit 444 is a post-processing component for determining whether the results of the recognition correspond to a recognition target sentence.

As shown in FIG. 4, the call command recognition network 420 includes the search routine and the confidence detection routine for call commands, thus remarkably reducing the computational load compared to the conventional continuous speech recognition in which the recognition network must be executed on all of the continuous speech that is input.

Therefore, the advantages of continuous speech recognition can be applied even to application fields such as portable devices or embedded systems, which have low computational processing ability and a small storage capacity.

The call command recognition network 420 includes a component for extracting feature parameters from input speech, and a component for executing a modified call command recognition network and detecting confidence (call command search routine and confidence detection routine).

Figure 5:
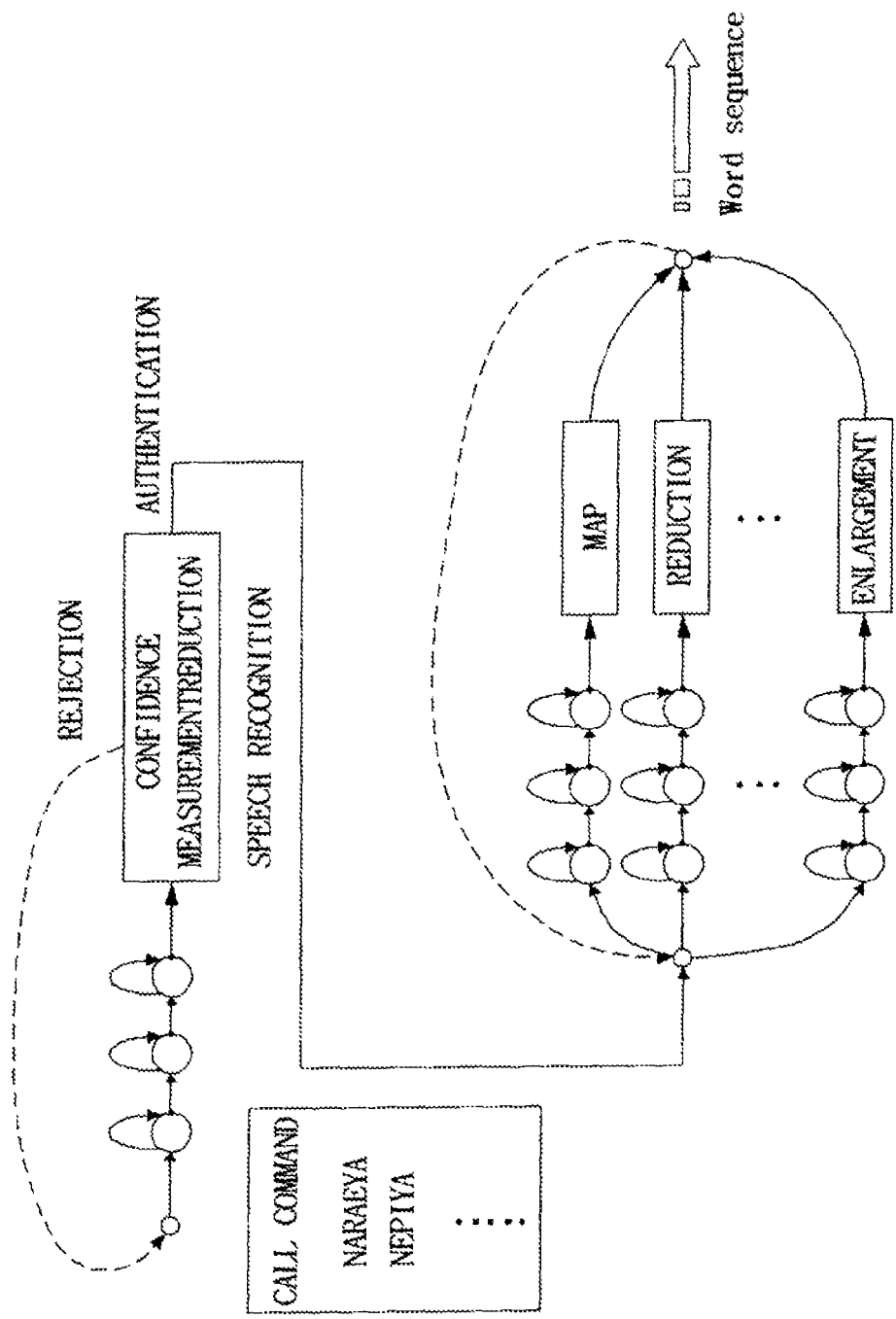
FIG. 5 is a diagram briefly showing the construction of a system for detecting a speech interval and recognizing continuous speech in noisy environments using the real-time recognition of call commands according to the present invention.

FIG. 5 is a diagram briefly showing the construction of the system for detecting a speech interval and recognizing continuous speech in noisy environments using the real-time recognition of call commands according to the present invention.

As shown in FIG. 5, the call command/continuous speech recognition system includes a call command recognition network for recognizing call commands and detecting the confidence thereof and a continuous speech recognition network for recognizing speech which is an actual command. The call command/continuous speech recognition system configures a recognition network for call commands (for example, "Naraeya", "Nepiya", etc.), executes the recognition network for one call command with respect to the input speech, and measures the confidence of the call command, thus determining whether to start a recognition network for actual continuous speech.

The scheme of the present invention has the advantages of remarkably reducing the memory capacity and computational processing ability which are necessary for a continuous speech recognition system using the conventional recognition network.

In order to solve the problems, the following technique is proposed in the present invention so that a higher rejection rate for unregistered words can be obtained and the speech recognition rate can be improved even though just a small computational load is used when the keyword-detection based continuous speech recognition system is implemented.

Figure 6:
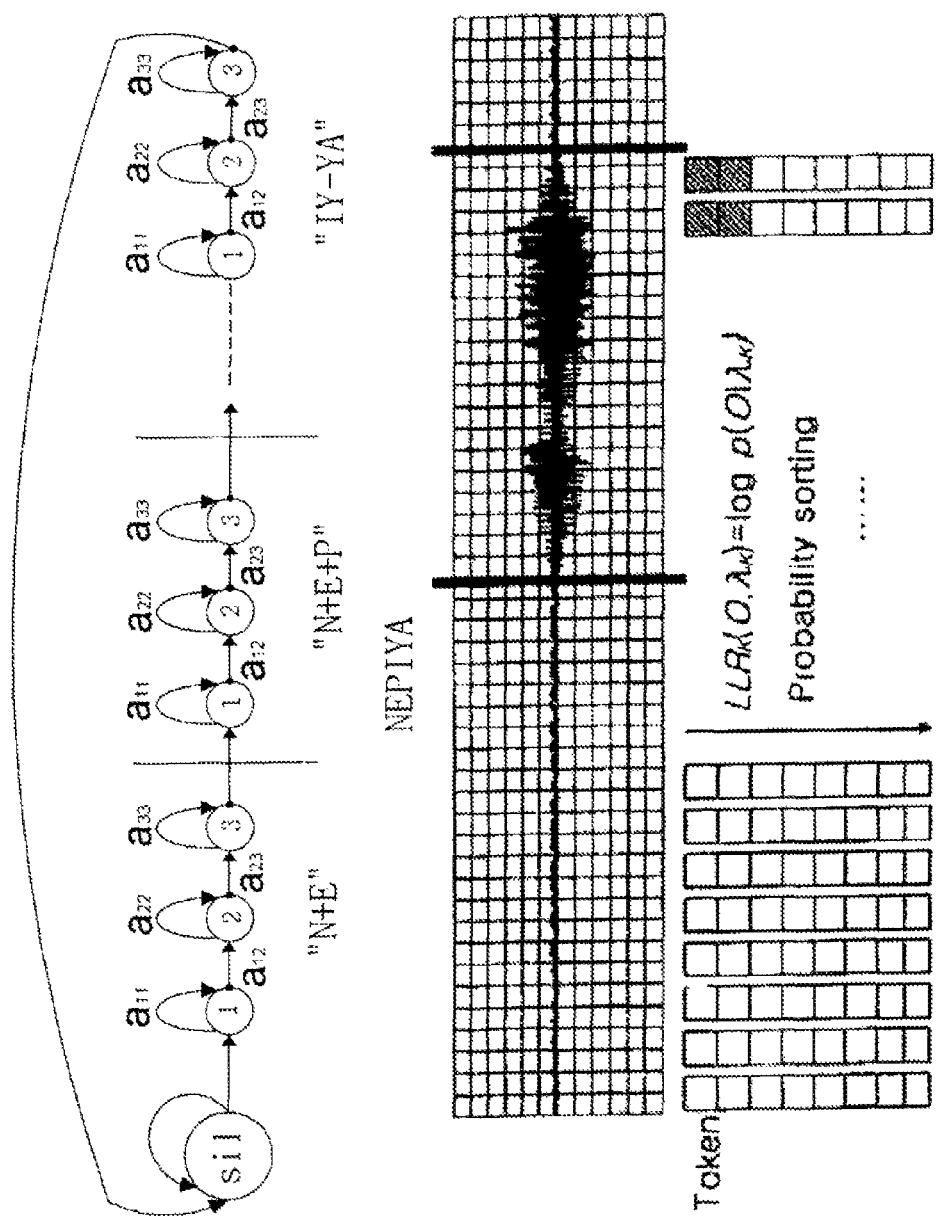
FIG. 6 is a diagram showing the call command recognition network of the system for detecting a speech interval and recognizing continuous speech in noisy environments using the real-time recognition of call commands according to the present invention.

FIG. 6 is a configuration diagram showing the call command recognition network of the system for detecting a speech interval and recognizing continuous speech in noisy environments using the real-time recognition of call commands according to the present invention.

As shown in FIG. 6, the recognition network for call commands is implemented using a left-to-right model and is configured to enable just the transition from one silence model to another silence model. On the basis of probability, every input speech frame is compared with a recognition network for only one word in real time. In this case, the width of a beam is limited to only 20 to 30 tokens, thus minimizing the computational load.

Since the recognition network is a recognition network for only one word, a minimum number of (20 to 30) tokens are required. When the accumulated probability of a relevant token, obtained at the moment at which the transition to a silence model is made while real-time computation is performed on the frames which are continuously input, corresponds to the top 10% of the 20 to 30 tokens in the call command recognition network, it is assumed that an actual call command has been spoken, and information about a relevant frame is transferred to the confidence detection routine 421, 422 and 423.

The time-series operating sequence of the call command recognition network is described below. First, the call command recognition network is configured (Step 1). The real-time recognition network for a recorded input speech frame is decoded and is then stored in tokens (Step 2). In this case, the individually stored bit values are sorted according to the log likelihood ratio given by the following Equation, $$LLR_k(0, \lambda_k) = \log p(0|\lambda_k) \qquad (1)$$

where $LLR_k$ is the log likelihood ratio, $\lambda_k$ is a k-th model parameter, and $p(0|\lambda_k)$ is the probability of the $\lambda_k$ model of the input speech frame.

After the accumulated probabilities have been sorted at Step 2, token beam pruning is performed on N (20 to 30) tokens (Step 3). Then, in the final stage of the call command recognition network, when the accumulated probability of a relevant token at the moment at which the transition to the silence interval is made at Step 3 corresponds to the top 10% (2 to 3), it is assumed that the call command has been spoken and the process proceeds to the confidence detection routine, otherwise the process proceeds to Step 2 (Step 4).

Generally, the number of tokens required for the configuration of a speech recognition network is about the number of words*the number of words. That is, the stable number of tokens required in order to recognize continuous speech of about 1,000 words is about 1,000,000. However, in the call command recognition network according to the present invention, the accumulated probabilities and model transition states for only 20 to 30 tokens are stored. Among these 20 to 30 tokens, only tokens for which the uppermost probability is stored are required. In FIG. 6, when a relevant token is a token for which the accumulated probability at the moment at which the transition to silence is made in $a_{33}$ is stored as the uppermost probability, it is recognized that the call command has been spoken, and the detection of confidence thereof is performed. Here, the range of the uppermost probability may be set to the top 10% range.

The computational load based on such a call command recognition network is limited to the amount of computation required for the real-time extraction of Mel Frequency Cepstrum Coefficients (MFCC) parameters and the decoding of 20 to 30 tokens, and is only an extremely small amount compared to the computational load based on the continuous speech recognition network, and thus the computational load can be reduced compared to the computational load based on the conventional VAD detection technique using energy and ZCR. However, in noisy environments, VAD detection rate can be remarkably improved.

When it is determined by the call command recognition network that the call command has been spoken, the confidence rate of the call command is detected.

All speech input through a microphone is recognized by one call command recognition network, and tokens having excellent accumulated probability values among the 20 to 30 tokens are transferred to the confidence detection routine (430 of FIG. 4). Here, in the tokens, information, obtained when the previously input speech makes a transition in the call command recognition network (auto segmentation information), is stored.

With respect to input speech (call command) assumed to be a call command 'Naraeya' or 'Nepiya' according to the recognized auto segmentation information, a ratio of the probability $p(0|\lambda_k)$ of phoneme models for the call command recognition network to the probability $p(0|\lambda_{\overline{k}})$ of anti-phoneme models, other than the assumed phoneme models, is computed, and thus the confidence rate of the call command is computed. This is represented by the following Equation (2), $$LLR_k(0, \lambda_k) = \log p(0|\lambda_k) - \log p(0|\lambda_{\overline{k}}) \qquad (2)$$

where LLR is log likelihood ratio, $\lambda_k$ is a phoneme model, and $\lambda_{\overline{k}}$ is an anti-phoneme model.

When LLR is determined by Equation (2) and 'LLR>threshold' is satisfied, the continuous speech recognition network is executed, otherwise the initial state is maintained. Here, the continuous speech recognition denotes the recognition of actual commands spoken subsequent to the call command.

Figure 7:
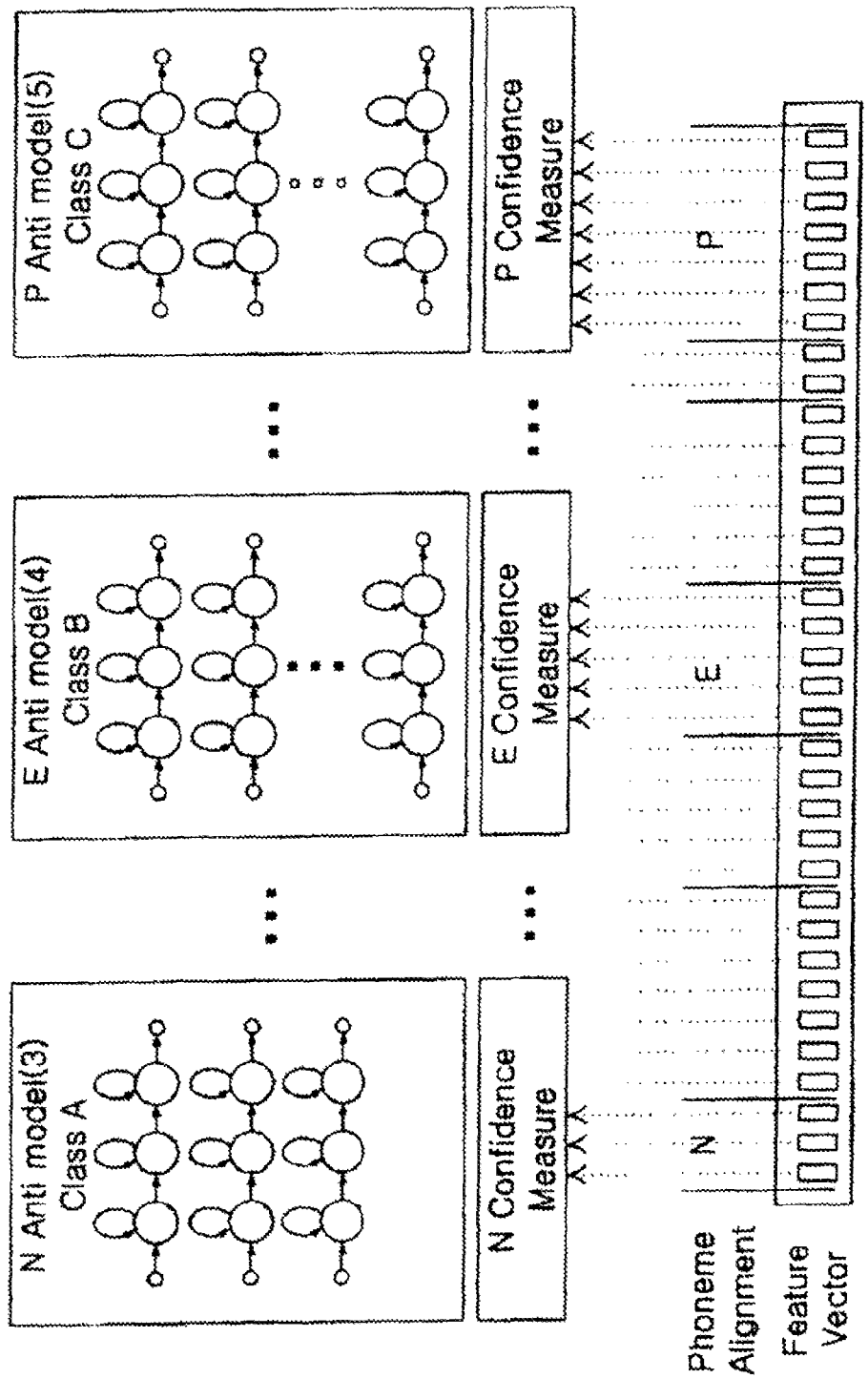
FIG. 7 is a diagram showing the results of the performance of confidence detection when the probability at the moment at which the transition to silence is made corresponds to the uppermost level among the probabilities of the tokens of a relevant frame in the call command recognition network according to the present invention.

FIG. 7 is a diagram showing the results of the performance of confidence detection when the probability at the moment at which the transition to silence is made corresponds to the uppermost level among the probabilities of the tokens of a relevant frame in the call command recognition network according to the present invention.

As shown in FIG. 7, depicted are the results of the performance of confidence detection when the probability at the moment at which the transition to silence is made corresponds to the uppermost level among the probabilities of the tokens of the relevant frame (in the case where a call command is assumed to be 'Nepiya') in the call command recognition network. That is, when the input speech frames transferred to the confidence detection routine are backtracked along the stored tokens, the call command is automatically segmented into portions of "N", "E", "P", "IY" and "YA", as shown in FIG. 7. When the confidence of each of the portions is greater than 0 due to a difference between the probability $p(0|\lambda_k)$ of its own phoneme model and the probability $p(0|\lambda_{\overline{k}})$ of an anti-phoneme model, the call command "Nepiya" is recognized, and speech spoken subsequent to the call command is transferred to the continuous speech recognition engine to perform continuous speech recognition. In contrast, when the confidence is less than 0, it is determined that the call command is not spoken, and the process returns to the initial state.

The speech recognition scheme using the conventional continuous speech recognition network detects a pause interval of speech using a silence model without extracting end points, whereas the call command recognition scheme proposed in the present invention executes a recognition network only in a predetermined interval after a call command, thus obtaining an advantage in that large-capacity memory and high-performance computational processing ability are not required.

Although the preferred embodiments of the present invention have been disclosed for illustrative purposes, those skilled in the art will appreciate that the present invention can be implemented in other detailed forms without changing the technical spirit or essential features of the present invention. Therefore, those embodiments should be understood to be exemplary rather than restrictive, and the scope of the present invention will be defined by the accompanying claims rather than the detailed description, and all changes or modifications derived from the meaning and scope of the claims and equivalents thereof should be interpreted as being included in the scope of the present invention.

INDUSTRIAL APPLICABILITY

The present invention relates to a speech recognition system, which can be industrially and widely used in the fields of home networking systems, intelligent robots, vehicle navigation terminals, and speech recognition systems for car-PCs.

The invention claimed is:

1. A method for detecting a speech interval and recognizing continuous speech using real-time recognition of call commands,
wherein, when a speaker speaks a call command, the call command is recognized, confidence rate of the call command is measured, and a speech interval spoken subsequent to the call command is applied to a continuous speech recognition engine at a moment at which the call command is recognized, thus recognizing speech of the speaker;
wherein the recognition of the call command is performed by a call command recognition network which is implemented using a Left-to-Right (LTR) model, and a speech frame input to the recognition network is configured to include predetermined tokens and is compared based on probability with the recognition network in real time;
wherein each of the predetermined tokens includes the speech frame and a silence interval accompanied by noise;
wherein the call command recognition network is configured such that, when an accumulated probability of the predetermined token which is computed in real time after passing through the call command recognition network falls within a range of a predetermined upper percentage, the call command is estimated to have been spoken, and the speech frame is transferred to a confidence measurement stage; and
wherein, when the call command recognition network is configured such that, a beam width is limited to 20 or 30 tokens and when the accumulated probability of the predetermined token obtained at a moment at which a transition to a silence model is made while real-time computation is performed on the frames which are continuously input corresponds to a top 10% of the 20 or 30 tokens in the call command recognition network, the call is estimated to have been spoken, and the speech frame is transferred to a confidence measurement stage;
wherein the confidence measurement stage is determined by the following equation:

$$LLRk(0,\lambda k)=\log p(0|\lambda k)-\log p(0|\overline{\lambda k})$$

where LLR is log likelihood ratio, $\lambda k$ is a phoneme model, and $\overline{\lambda k}$ is an anti-phoneme model.

* * * * *